April 20, 1937.    J. W. LEIGHTON    2,077,844
ADJUSTABLE HINGE JOINT
Filed Sept. 29, 1934
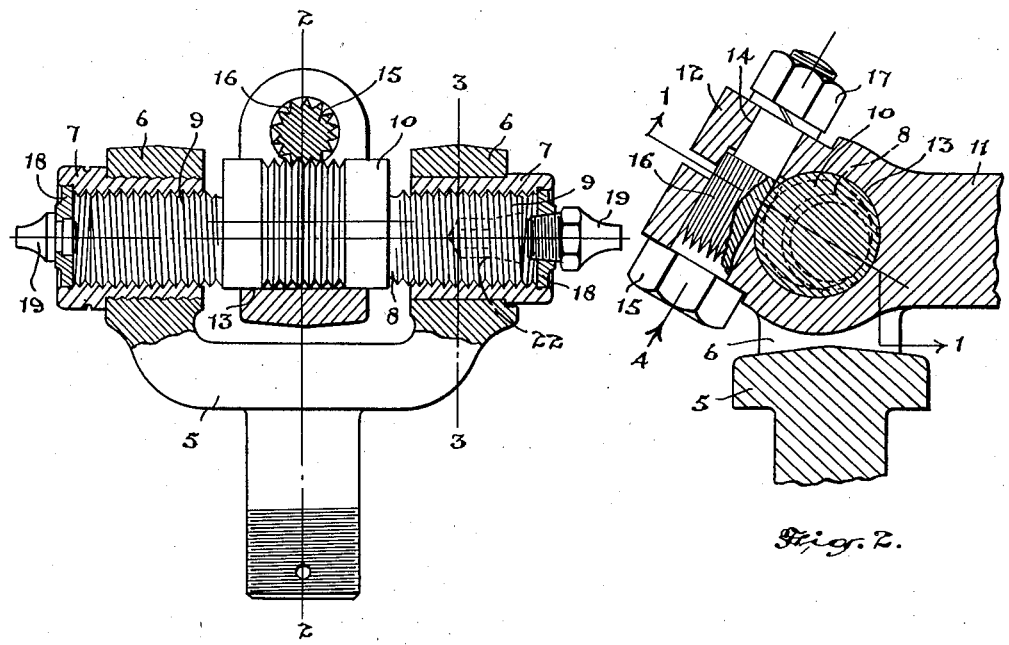
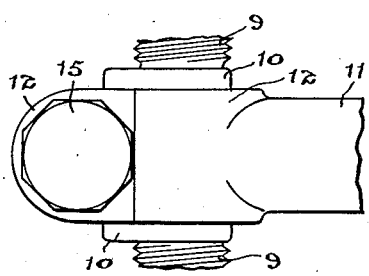
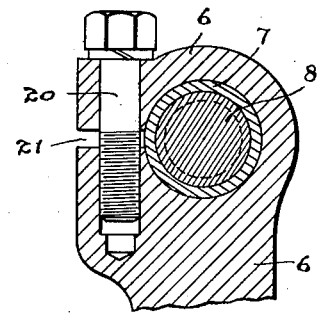
Inventor.
John Wycliffe Leighton.

Patented Apr. 20, 1937

2,077,844

UNITED STATES PATENT OFFICE 2,077,844

ADJUSTABLE HINGE JOINT

John Wycliffe Leighton, Port Huron, Mich.

Application September 29, 1934, Serial No. 746,152

6 Claims. (Cl. 287—100)

The principal object of this invention is to provide a very simple and inexpensive form of hinge joint particularly adaptable for the knuckle joint of the pivot arm support of independent wheel suspension for the front end of motor cars, which will enable a very accurate adjustment for the camber setting of the motor car wheel.

The principal feature of the invention consists in the novel construction of the hinge pin having the end supported in journal bearings in a port or yoke member, and having an eccentric central portion adjustably mounted in a hinge arm or swinging member, and adapted to be clamped securely in adjusted position.

In the accompanying drawing Figure 1 is a part longitudinal section and elevation of a hinge joint constructed in accordance with this invention, the section being taken on the line 1—1 of Figure 2.

Figure 2 is a transverse section through the hinge joint taken on the line 2—2 of Figure 1.

Figure 3 is a cross section taken through the line 3—3 of Figure 1.

Figure 4 is an elevational view of the joint taken in the direction of the arrow at the point 4 in Figure 2.

In numerous forms of independent front wheel suspension at present in use, the wheel axle is mounted on a king pin pivoted in a member supported between two substantially horizontal arms, which are pivoted or hinged to the vehicle frame, and the particular function of the present invention is to facilitate the adjustment of the member carrying the king pin so as to effect the alteration of the angularity of the axle and the consequent camber of the wheel.

The joint may, however, be found useful in other devices for altering the relative position of two hinged members.

In the application of the invention herein shown the yoke or forked-shaped member 5 may form a part of the member which carries the king pin to support the wheel axle, or it may be either of two hinged members. The lug ends 6 of the member 5 are here shown provided with bearing bushings 7, shown formed with internally threaded bearing surfaces.

The hinge pin 8 is provided with threaded ends 9, which engage the threaded bearing surfaces of the bushings 7, and the central portion of the pin is formed with a cylindrical portion 10, the axis of which is eccentric to the main axis of the pin. The other of the hinge arms 11 is formed with a jaw end 12 provided with a cylindrical orifice 13 in which the eccentric cylindrical portion of the hinge pin is fitted, the jaw end is provided with a transverse slot 14, and the bolt 15 extends through the jaw end across this slot, the shank of the said bolt being provided with a plurality of longitudinal flutes 16, which provides a bolt with a cross section having a regularly serrated perimeter.

The central portion of the eccentric cylindrical portion 10 of the hinge pin is provided with a plurality of regular surface corrugations, which correspond in width and depth to the shape of the flutes of the bolt 15 and the flutes of the bolt engage these corrugations in the pin, which thus lock the bolt from turning and also hold the hinge pin with the cylindrical portion in a centralized position between the lugs 6 of the yoke member. The bolt is provided with a suitable lock nut 17.

The ends of the bushings 7 are closed by means of discs 18 provided with lubricating fittings 19, so that lubricants may be forced into the bearings at either end. The bushings 7 are preferably adjustable in relation to each other, so that the bearing threads may be adjusted into proper relation the one to the other to properly engage in bearing contact with the spiral threads of the hinge pin, and the locking bolt 20 is provided to extend across the slots 21 cut in one of the lugs 6 to lock the bushing therein, when the proper adjustment has been made.

The hinge pin is provided with a socket recess 22 to provide a ready means for rotating the hinge pin, so as to swing the eccentric portion 10 to different relative positions.

In the use of this device the yoke 5 and the arm 11 are arranged in substantially right angular relation, and the centres of oscillation between these two members may be altered by loosening the bolt 15 in the jaw end 12 and turning the hinge pin, thus throwing the eccentric portion 10 inwardly or outwardly thereby altering the relative position of the arms connected by the hinge joint. By this means the position of the member carrying the wheel axle will be changed relative to the supporting members, and an accurate adjustment of camber of the wheels will be effected.

The fluted portion 16 of the bolt 15 prevents relative longitudinal movement of the hinge pin, but when relative longitudinal adjustment of the member 11 in respect to the hinge pin is desired to eliminate binding at the joints of the pivotal structure or for the purpose of altering the castor adjustment of the vehicle wheel the bolt 16 may be loosened, and by being turned the engagement of the flutes on said bolt with the corrugations on the hinge pin will move the end of the arm 11 in an axial direction longitudinally of the hinge pin.

It will be readily appreciated by those skilled in the art that these several adjustments, that is, the rotation of the hinge pin to adjust camber of the wheel, the rotation of the bolt 15 to adjust castor of the wheel, and the rotation of the loose bushings to adjust the threads and the bearings contact will provide an exceptionally desirable hinge joint.

The parts are extremely simple in their construction and are easily and quickly assembled, and when adjusted will hold their adjustment accurately under the most difficult conditions.

What I claim as my invention is:—

1. In a hinge joint, the combination of a pair of spaced members to be relatively adjusted in directions respectively axially and transversely of the hinge axis and capable of relative swinging movement about said axis, a hinge pin having its end journalled in one of said members and having an eccentric portion both adjustably rotatable about the hinge pin axis and slidable in a direction axially of the hinge pin in the other of said members, and means for rigidly securing said eccentric portion in the said other hinge member to preserve both the rotative and sliding adjustment thereof in said member, including a member operable to impart an adjusting thrust in a direction axially of the hinge pin between said eccentric and said other of said members whereby the relative spacing of said respective members in a direction axially of the hinge pin is effected.

2. A hinge joint comprising a pair of spaced arms to be relatively adjusted in directions respectively axially and transversely of the hinge axis and capable of relative swinging movement about said axis, one of said arms having a pair of spaced lugs provided with journal bearings, a hinge pin having threaded bearing engagement with the journal bearing of said lugs, said hinge pin having an eccentric portion arranged between its journalled ends, the other of said arms having a jaw end embracing the eccentric portion of the hinge pin and being both slidably adjustable thereon axially of the hinge pin between the spaced lugs of the first-mentioned arm and rotatably adjustable thereon about the hinge pin axis, and means for locking the jaw end of said second arm on said eccentric member in adjusted position including a rotatable member operatively engaging said hinge pin to effect a positive adjustment thereof in the direction of its axis in the jaw end.

3. A hinge joint comprising a pair of arms, one of which is provided with a pair of spaced lugs, said lugs having journal bearings therein, a hinge pin journalled in said bearings and having a central eccentric portion between said bearings, said eccentric portion having circumferential corrugations, the other of said arms having a jaw end embracing the eccentric portion of the hinge pin, and a bolt mounted in the jaw end of the latter member and having longitudinal corrugations adapted for engagement with the circumferential corrugations of the eccentric member of said hinge pin to effect the movement of the arm mounted on the eccentric portion of the hinge pin, and to lock said hinge pin and arm together.

4. In a hinge joint the combination with spaced-apart members to be hinged and relatively adjusted, of a hinge pin journalled in one of said members, the other member being mounted on said hinge pin for axial adjustment to vary its spaced relation to the other hinge member, and means for positively locking said hinge pin in said second-mentioned hinge member, said means including a serrated member inserted in said second-mentioned hinge member in tangential relation to said hinge pin and directly interlocking with the latter.

5. In a hinge joint the combination with spaced-apart members to be hinged and relatively adjusted, of a hinge pin journalled in one of said members, the other member being mounted on said hinge pin for axial adjustment to vary its spaced relation to the other hinge member, said hinge pin having longitudinally spaced corrugations, a locking bolt rotatably mounted in said second-mentioned hinge member in transversely disposed relation and having circumferentially spaced corrugations meshing with the corrugations of the hinge pin whereby to effect relative sliding displacement of said hinge pin and said second-mentioned hinge member on the rotation of said locking bolt, and means for locking said bolt.

6. In a hinge joint, the combination with spaced members to be hinged and relatively adjusted, of a hinge pin journalled in one of said members, the other member having a jaw end mounted on the hinge pin for axial adjustment to vary its spaced relation to the other hinge member, said hinge pin having a toothed portion embraced by said jaw end, a toothed bolt extending through said jaw end and having a toothed periphery meshing with the toothed portion of said hinge pin and rotatable to effect relative axial displacement of said hinge pin and jaw end, and a clamping nut threaded on said bolt and adapted to simultaneously lock said toothed bolt against rotation and to firmly clamp said jaw end about said hinge pin.

JOHN WYCLIFFE LEIGHTON.